April 11, 1939. J. R. JOHNSON 2,153,567
MACHINE TOOL DRIVING MECHANISM
Filed June 12, 1936 3 Sheets-Sheet 1

INVENTOR
John R. Johnson
By Parker, Carlson, Pitzner & Hubbard
ATTORNEYS

April 11, 1939.    J. R. JOHNSON    2,153,567
MACHINE TOOL DRIVING MECHANISM
Filed June 12, 1936    3 Sheets-Sheet 3

INVENTOR
John R. Johnson
By Parker, Carlson, Pitzner & Hubbard
ATTORNEYS

Patented Apr. 11, 1939

2,153,567

UNITED STATES PATENT OFFICE 2,153,567

MACHINE TOOL DRIVING MECHANISM

John R. Johnson, Rockford, Ill., assignor to Ingersoll Milling Machine Company, Rockford, Ill., a corporation of Illinois Application June 12, 1936, Serial No. 84,845

9 Claims. (Cl. 74—283)

This invention relates to machine tools and more particularly driving mechanisms therefor.

The primary object of the invention is to provide an improved and simplified driving mechanism adapted to selectively import a rapid traverse motion and a relatively slower feed motion to an element of a machine tool from a single substantially constant speed source of rotary power.

More specifically, it is an object of the invention to provide a driving arrangement for selectively imparting such motions to an element of a machine tool, the driving arrangement embodying an improved form of differential gear mechanism which is particularly adapted to withstand the heavy torque loads imposed thereon in such installations.

A further object of the invention is to provide a driving mechanism for an element of a machine tool by means of which the element may be driven either at a rapid traverse rate or at a slower feed rate from a single substantially constant speed source of rotary power, the driving mechanism being adapted for selective variation of the feed rate.

Further objects and advantages of the invention will become apparent as the following description proceeds and the features of novelty which characterize the invention are pointed out with particularity in the claims annexed to and forming a part of this specification.

For a better understanding of the invention, reference may be had to the accompanying drawings, in which.

Figure 1:
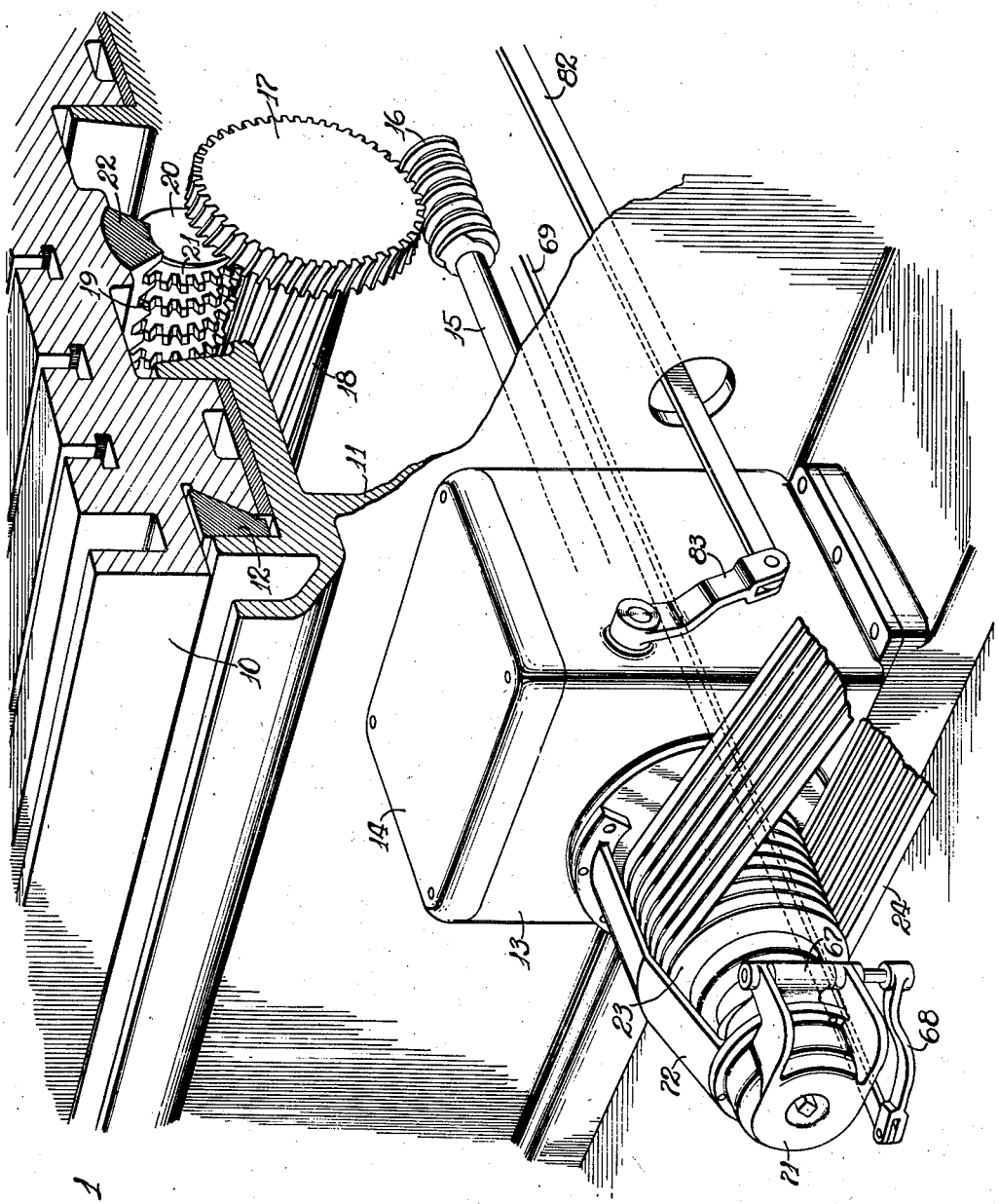
Figure 1 is a perspective view of a portion of a machine tool provided with a driving mechanism embodying the invention.

In the exemplary form shown in the drawings, the invention is embodied in a driving mechanism for imparting longitudinal movement to an horizontal table 10 of a machine tool. The table 10 is slidably mounted in suitable horizontal ways formed on the top of a bed frame 11 and is retained in position thereon by gibs 12. The gearing of the driving mechanism itself is enclosed by a casing 13 equipped with a removable cover 14 and mounted on the rear side of the bed frame 11. A driven shaft 15 extends from the inner side of the casing 13.

Any suitable arrangement may be used to connect the driven shaft 15 to the table 10. The particular arrangement illustrated includes a worm 16 mounted on the shaft 15 and meshing with a worm wheel 17, whish is in turn rigidly connected to the outer end of an elongated pinion 18. The pinion teeth mesh with teeth 19 which are disposed in long pitch helical rows on a worm 20. The teeth 19 are formed by notches in the extended upper portions of a short pitch helical worm thread 21. The worm thread meshes with an elongated rack 22 rigidly secured to the bottom of the table 10. It will thus be seen that upon rotation of the driven shaft 15 the worm wheel 17 and its attached pinion 18 will be rotated by the worm 16. The rotation of the pinion 18 causes a rotation of the worm 20 and, consequently, longitudinal movement of the rack 22 and the table 10.

In accordance with the present invention, the improved driving mechanism is adapted to effect rotation of the shaft 15 at either of two selected speeds in order that the desired rapid traverse or feed motion of the table 10 may be had. In general, the driving mechanism includes as its principal elements a driving member and a driven member having a differential gear mechanism interposed therebetween and an arrangement adapted selectively to connect one of the terminal elements of the differential gear mechanism to the driving member or to hold the same against rotation while the other terminal element is also connected to the driving member. In this manner, the intermediate element of the differential gear mechanism, which is connected to the driven member, may be rotated at either of two selected speeds.

In the preferred construction illustrated, a driving element in the form of a pulley 23 is rotated by a plurlity of V-belts 24 from a suitable, substantially constant speed source of power, such as an electric motor (not shown). It will be understood that by the term "constant speed" I do not intend to exclude motors of the type whose speed is in part dependent upon the load imposed thereon. The term is on the other hand intended to indicate that no separate electrical speed control arrangement, for example, need be provided for the driving motor or other prime mover.

The driving pulley 23 is connected to the driven shaft 15 through a driving mechanism including a differential gearing having its intermediate element secured to the driven shaft and one of its terminal elements operatively connected to the driving pulley. The other terminal element may be selectively connected to the driving pulley or held against rotation. In the preferred construction illustrated, the intermediate element of the differential gear mechanism is shown as a plurality of planetary gears 25 rotatably mounted on pins 26. The opposite ends of the pins 26 are journaled in a laterally extending flange 27 formed on the inner end of the driven shaft 15 and in a plate 28 supported adjacent thereto by spacers 29 and screws 30.

One terminal element of the differential gear mechanism is formed by a ring gear 31 meshing with the planetary gears 25 and surrounding the same. The ring gear 31 is provided with a cylindrical body portion having laterally extending side portions 32 and 33. The laterally extending portion 32 is journaled in a cylindrical bore 34 formed in a cylindrical supporting member 35 surrounding the driven shaft 15. The supporting member 35 is detachably secured by screws 36 in a suitable opening formed in the inner side wall of the casing 13. The laterally projecting portion 33 of the ring gear 31 is supported by an arcuate inwardly extending portion 37 of a cylindrical supporting member 38, which is detachably secured by screws 39 in an opening formed in the opposite side wall of the casing.

The other terminal member of the differential gear mechanism comprises a sun gear having longitudinally extending teeth 40 formed on the inner end of a shaft 41. This shaft is arranged substantially in alinement with the driven shaft 15 and one end thereof is journaled in an antifriction bearing 42 in a recess 43 formed at the inner end of the driven shaft. The shaft 41 extends through an aperture 28ª in the plate 28, and the projecting end is journaled in a sleeve 45. It will be seen that the parts of the differential gear mechanism are arranged in compact form while at the same time are of rugged construction and the mating surfaces thereof are of large area so as to be adapted to transmit the heavy torque loads to which such a driving mechanism is subjected.

The driving pulley 23 is connected in driving relation with the ring gear 31 preferably by an arrangement which permits of selective variations in the relative speeds of rotation thereof. In the preferred construction illustrated, the pulley 23 is rigidly connected by screws 44 to the flange end of the sleeve 45 which is journaled in a suitable antifriction bearing comprising balls 46, an inner race 47, and a cooperating outer race. The outer race is positioned in complementary counterbores formed in the supporting member 38 and a clamping plate 49, while the inner race is pressed against a shoulder 50 on the shaft 45 by a locking collar 51. Worm threads 52 are formed on the sleeve 45 and mesh with a worm wheel 53 mounted on a jack shaft 54.

The worm wheel 53 is connected to a worm 55 by a suitable gearing connection hereinafter described in greater detail. For the present, it is believed to be sufficient to say that the worm wheel 53 and worm 55 are connected in driving relation by this gearing so that power is transmitted from the pulley 23, through sleeve 45, worm wheel 53, and the later described connecting gearing to the worm 55. This latter worm is mounted on a shaft 56 paralleling the shaft 54 and meshes with worm wheel teeth 57 formed on the exterior of the ring gear 31 and serves to rotate the same.

An arrangement is provided for selectively controlling the operation of the sun gear 40, which forms the second terminal element of the differential gear mechanism, in such a manner that it may either be positively rotated, rigidly held against rotation, or allowed to rotate freely. This arrangement preferably includes a pair of manually operable friction devices 58 and 59. In general, the friction device 58 serves as a clutch to releasably connect the driving pulley and shaft 41 in driving relation, while the device 59 constitutes a friction brake for releasably holding the shaft 41 against rotation.

The clutch 58, which is of the well known multiple disk type, includes a series of friction plates 60 mounted within a bore 61 formed in the outer end of the pulley 23 for rotation therewith. A plurality of interposed friction plates 62 are carried by a hub 63 having a splined connection with the shaft 41. The hub 63 may thus be moved axially along the shaft 41 so that the plates 62 frictionally engage the cooperating clutch plates 60 to connect the driving pulley 23 and shaft 41 in operative relation. Axial movement of the hub 63 along the shaft 41 is effected by a manual operating mechanism including a pivotally mounted dog 64 engageable with the end of the hub and with a cam surface 65 formed on a longitudinally slidable sleeve 66. Annular shoulders 66ª in the sleeve 66 are engaged by a pin 67ª in a pivotally mounted link 67 connected through a link 68 with a manual operating lever 69, which extends to the front side of the bed frame 11 (see Fig. 1).

The brake 59 is similar in construction to the clutch 58 and includes a plurality of friction plates 70 mounted within and held against rotation relative to a cup-shaped end cap 71 on an outwardly extending guard plate 72. It will be noted that the outer end of the shaft 41 is journaled in a suitable antifriction bearing 72ª mounted in the outer end of the end cap 71. A plurality of cooperating friction plates 73 are interposed between the friction plates 70 and are mounted on a hub 74. The hub 74 is splined to the shaft 41, being axially movable thereon by a pivotally mounted dog 75 engaging a cam surface 76 formed on the outer end of the sleeve 66.

It will thus be seen that when the operating lever 69 is moved to the left (as viewed in Fig. 2) the dog 64 will ride upwardly along the cam surface 65, thus moving the hub 63 to the left and frictionally engaging the clutch plates 62 with the cooperating plates 60. This engagement of the clutch 58 connects the driving pulley 23 in driving relation with the shaft 41 so that both of the terminal elements of the gear mechanism, that is, the sun gear 40 and ring gear 31 are positively rotated. These motions are combined by the differential gearing, and as a consequence, the driven shaft 15 is rotated at a relatively high rate of speed by planetary gears 25 so that the table 10 is moved along the bed frame 11 at a rapid traverse rate.

Then, in order to effect a relatively slower feed motion of the table 10, the operating lever 69 is moved to the right (as viewed in Fig. 2) so that the dog 75 is moved by the cam surface 76 in a direction to press the plates 73 of the brake 59 against the cooperating non-rotatable plates 70 while the clutch 58 is disengaged. When the brake 59 is thus applied, the shaft 41 is held rigidly against rotation. Thus the planetary gears 25 will fulcrum about the sun gear 40 due to the rotation of the ring gear 31 and rotate the driven shaft at a relatively slower rate. As a result, the table 10 will be moved along the bed frame 11 in the same direction as when traveling at its rapid traverse rate described above, but at a relatively slower feed rate.

If it is desired to reverse the direction of movement of the table 10, the direction of rotation of the driving pulley 23 may be reversed by reversing the prime mover and a rapid traverse rate or feed rate of motion may then be imparted to the table 10 in the opposite direction.

Figure 2:
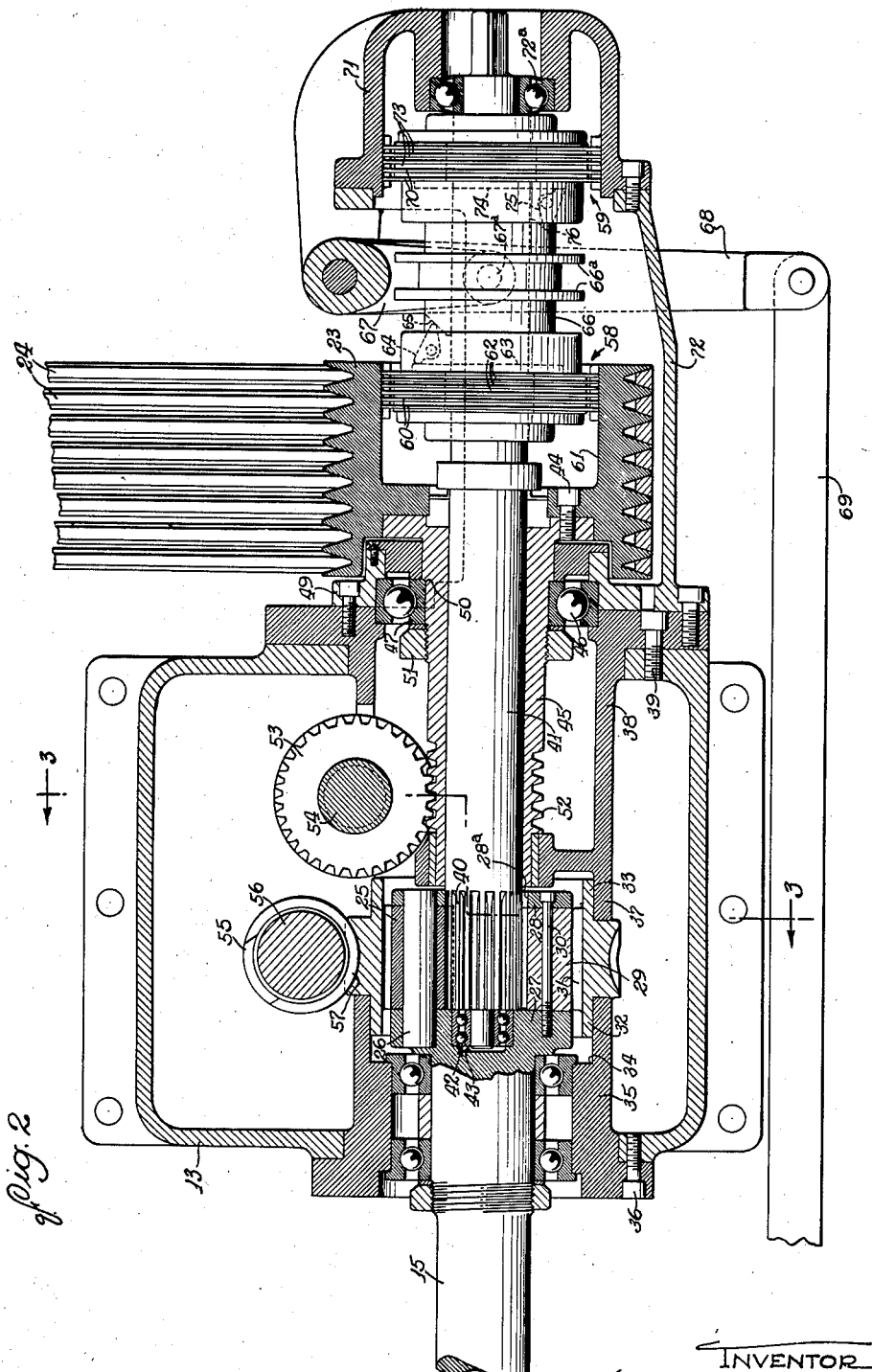
Fig. 2 is an enlarged longitudinal sectional view of the driving mechanism shown in Fig. 1.

When it is desired to stop the table 10 at any particular point, both of the clutches 58 and 59 are disengaged by moving the manual operating lever 69 to its midposition shown in Fig. 2. As a result of such simultaneous disengagement, the shaft 41 is left free to rotate. It will be noted that the shaft 41 is mounted in antifriction bearings 42 and 72a and, consequently, offers little resistance to rotation, especially as compared to the driven shaft 15 which is connected to the relatively heavy machine tool table 10. As a result, rotation of the planetary gears 25 by the ring gear 31 will cause the sun gear 40 to rotate while the driven shaft 15 remains stationary.

Suitable auxiliary speed change gearing has been provided for connecting the worm wheel 53 and worm 55 in such a manner that the relative speeds of rotation thereof and therefore the rate at which the work table is fed may be selectively varied. Herein this connection includes a gear 77 (Fig. 3) and a relatively larger gear 78 splined on the shaft 56 for rotation therewith but adapted for axial movement relative thereto. Axial movement of the gears 77 and 78 is effected by an operating mechanism including a sleeve 79 having arms 80 engaging the hubs of the gears 77 and 78. The sleeve 79 is slidably mounted on a fixed guide rod 81 and is shiftable by a manual operating mechanism including a link 82 (see Fig. 1) extending to the front of the machine and pivotally connected at its rear end to a lever 83. This lever is in turn rigidly connected to a shaft 84 journaled in the end wall of the casing 13 and having a toothed segment 85 secured thereto. The segment 85 meshes with a series of rack teeth 86 formed on the upper side of the sleeve 79. It will thus be seen that the gears 77 and 78 may be moved axially along their supporting shaft 56 in order to engage different driven gears by selective longitudinal movement of the operating link 82.

Figure 3:
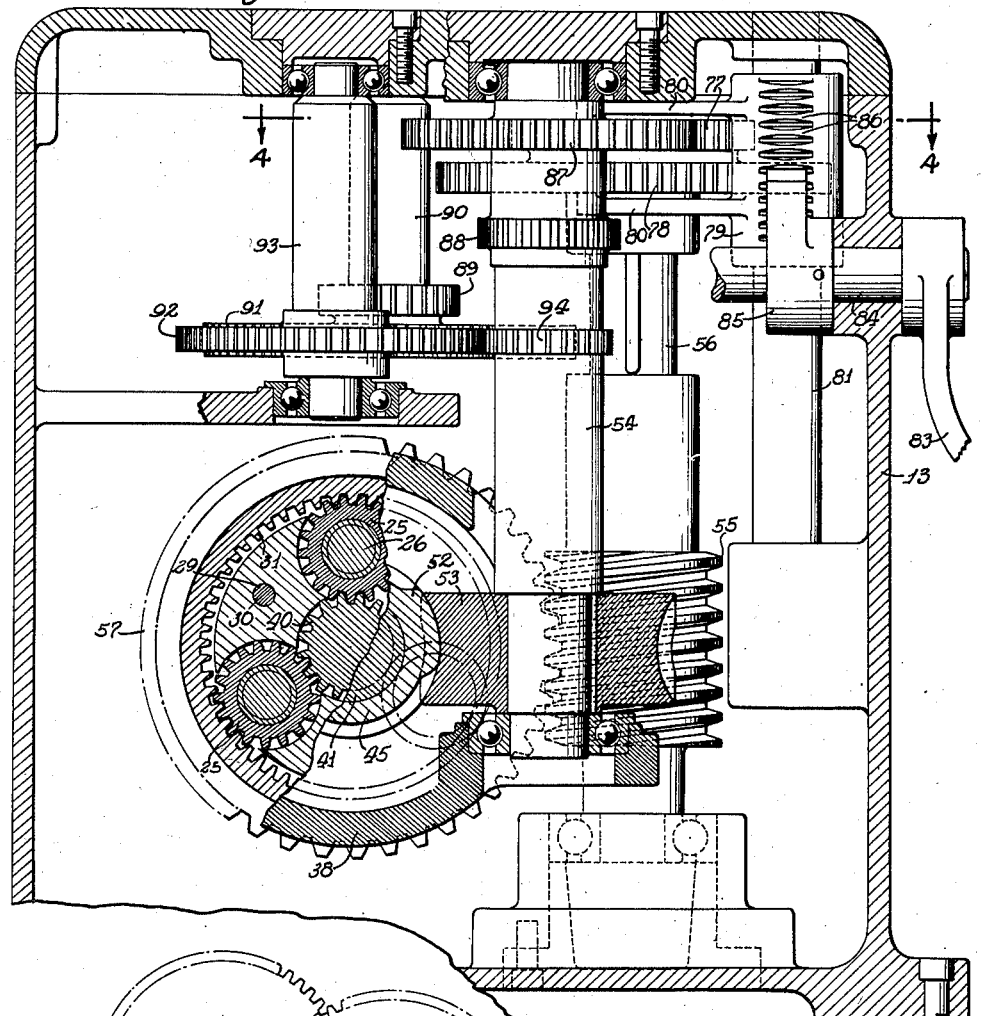
Fig. 3 is a transverse sectional view along the line 3—3 of Fig. 2 of the driving mechanism shown therein.
Figure 4:
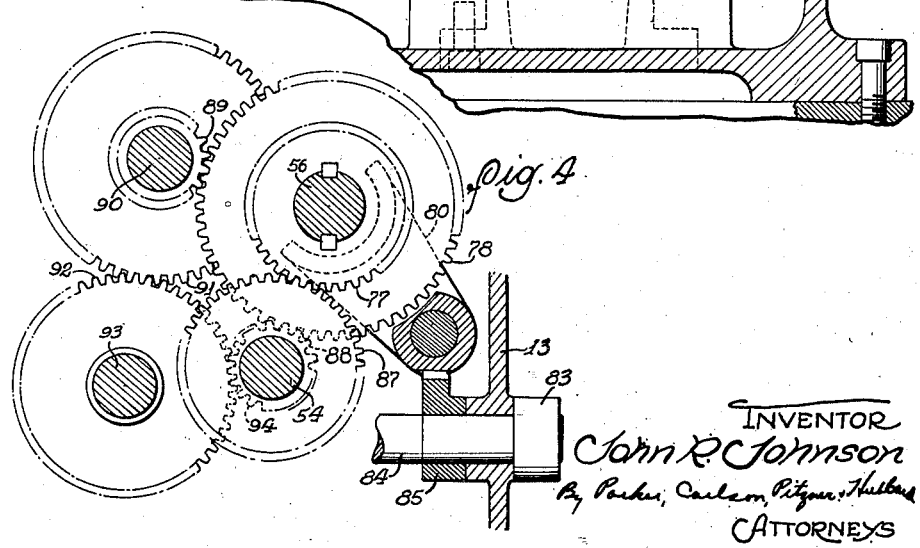
Fig. 4 is a section taken along the line 4—4 of Fig. 3.

When the gears 77 and 78 are in the position shown in Fig. 3, the gear 78 runs free while the gear 77 meshes with a gear 87 rigidly connected to the shaft 54. Rotary movement at a rate determined by the relative sizes of the gears 77 and 87 is thus imparted to the shaft 56 from the sleeve 45 and its attached pulley 23 through the worm 52 and worm wheel 53, the gears 77 and 87 to the shaft 56 and then to the ring gear 31 by worm 55 and worm wheel 57. When it is desired to decrease the speed of rotation of the ring gear 31 with respect to the driving pulley 23, the gears 77 and 78 are shifted axially along the shaft 56 so that the gear 77 is disengaged from the gear 87 and the larger gear 78 is moved into engagement with a relatively small pinion 88 secured to the shaft 54.

When it is desired to decrease the speed of rotation of the ring gear 31 still further with respect to the speed of rotation of the driving pulley 23, the gear 78 is moved out of engagement with the pinion 88 and into engagement with an idler pinion 89 mounted on a stub shaft 90. A second and larger gear 91 is also secured to the shaft 90 and meshes with an idler gear 92 mounted on a rotatable stub shaft 93. The idler gear 92 meshes with a pinion 94 rigidly secured to the shaft 54. The idler gears are provided in order to decrease the relative speed of rotation of the shaft 54 with respect to the shaft 56, while at the same time maintaining the same relative directions of rotation as was had with the direct gear connections therebetween as described above.

Although a gearing arrangement has been illustrated by means of which the driven element may be rotated at a rapid traverse rate and at any selected one of three different feed rates, it will be apparent that the gear connections may be varied in order that more or less variations can be effected to meet the requirements of a particular installation. No matter what the position of operating link 82 may be, the operator can always bring the machine to a stop by moving operating link 69 to its midposition, thus providing a control which is especially safe and quickly responsive.

While particular form of the invention has been shown and described in connection with a machine tool having a reciprocable table, it should be understood that there is no intention to thereby limit the invention to the particular form illustrated and described, but that on the other hand, it is intended to cover in the appended claims all modifications within the spirit and scope of the invention.

I claim as my invention:

1. A driving mechanism for selectively imparting motions at different rates to a machine tool element from a single source of rotary power comprising, in combination, axially alined rotatable driving and driven elements, a planetary gearing having ring and sun gears and planet gears meshing with said ring and sun gears and rotatably supported on said driven element, a shaft carrying said sun gear, a clutch for connecting said driving element and said shaft, a sleeve surrounding said shaft and rotatable with said driving element, means providing a permanently engaged driving connection between said sleeve and said ring gear and arranged to effect rotation of said driven element at one of said rates when said sun gear is held against rotation, said driven element being rotated at said other rate when said clutch is engaged, and means for releasably holding said sun gear against rotation.

2. A driving mechanism for selectively imparting motions at a rapid traverse rate or a relatively slower feed rate to a machine tool element from a single source of rotary power comprising, in combination, rotatable driving and driven elements, a planetary gearing having ring and sun gears and planet gears meshing with said ring and sun gears and rotatably supported on said driven element, gearing providing a permanently engaged driving connection between said driving element and said ring gear and arranged to effect rotation of said driven element at said feed rate when said sun gear is held against rotation, means providing a driving connection between said driving element and said sun gear including a clutch, said driven element being rotated at said rapid traverse rate when both of said connections are effective, a brake for releasably holding said sun gear against rotation, and selectively operable means controlling the engagement of said clutch and the application of said brake.

3. A driving mechanism for selectively imparting motions at a rapid traverse rate or a relatively slower feed rate to a machine tool element from a single source of rotary power comprising, in combination, rotatable driving and driven elements, differential gearing having first and second terminal members and an intermediate member, the latter being connected to said driven element, gearing providing a normally engaged driving connection between said driving element and said first terminal member and arranged to effect rotation of said driven element at said feed rate when said other terminal member is held against rotation, means providing a driving connection between said driving element and said second terminal member including a clutch, said driven element being rotated at said rapid traverse rate when both of said connections are effective, a brake for releasably holding said second terminal against rotation, and a control element movable selectively through three positions in one of which selectively said clutch and said brake are disengaged whereby to interrupt rotation of said driven element, in a second one of which said clutch is engaged causing rotation of said driven element at said rapid traverse rate, and in the third of which said brake is applied to hold said second terminal member against rotation and cause rotation of said driven element at said feed rate.

4. A driving mechanism for selectively imparting motions at a rapid traverse rate or a relatively slower feed rate to a machine tool element from a single source of rotary power comprising, in combination, a rotatable driving element, differential gearing having first and second terminal members and an intermediate member, the latter being connected to said machine tool element, means providing a driving connection between said driving element and said first terminal member and arranged to effect rotation of said intermediate member at feed rate when said second terminal member is held against rotation, means providing a driving connection between said driving element and said second terminal member including a clutch, said intermediate member being rotated at rapid traverse rate when both of said connections are effective, a brake for releasably holding said second terminal against rotation, and selectively operable means controlling said brake and clutch.

5. A driving mechanism for selectively imparting motions at a rapid traverse rate or a relatively slower feed rate to a machine tool element from a single source of rotary power comprising, in combination, a rotatable driving element, differential gearing having first and second terminal members and an intermediate member, the latter being connected to said machine tool element, means providing a normally engaged driving connection between said driving element and said first terminal member of a ratio such as to effect rotation of said intermediate member at feed rate when said other terminal member is held against rotation, selectively operable means actuatable independently of said normally engaged driving connection by which said second terminal member may be connected to said driving element to rotate the intermediate member at rapid traverse rate, may be freed for independent rotation, or may be held against rotation.

6. A driving mechanism for selectively imparting motions at a rapid traverse rate or a relatively slower feed rate to a machine tool element from a single source of rotary power comprising, in combination, a rotatable driving element, differential gearing having first and second terminal members and an intermediate member, the latter being connected to said machine tool element, means providing a driving connection between said driving element and said first terminal member of a ratio such as to effect rotation of said intermediate member at feed rate when said other terminal member is held against rotation, said driving connection including speed change mechanism by which said feed rate may be varied selectively, selectively operable means by which said second terminal member may be connected to said driving element to rotate the intermediate member at rapid traverse rate, may be freed for independent rotation, or may be held against rotation.

7. A driving mechanism for selectively imparting motions at different rates to a machine tool element from a single source of rotary power comprising, in combination, rotatable driving and driven elements, differential gearing having first and second terminal members and an intermediate member, the latter being connected to said driven element, means providing a driving connection between said driving element and said first terminal member and arranged to effect rotation of said intermediate member at one of said rates when said other terminal member is held against rotation, means providing a driving connection between said driving element and said second terminal member including a friction clutch, said driven element being rotated at the other of said rates when both of said connections are effective, a friction brake having a non-rotatable part and a part frictionally engageable therewith and rotatable with said second terminal member, and means selectively controlling said clutch and said brake.

8. A driving mechanism for selectively imparting motions at a rapid rate or at a relatively slower rate to a machine tool element from a single rotary source of power comprising, in combination, differential gearing having first and second terminal members and an intermediate member, the latter being connected to said machine tool element, driving connections between said source of power and the respective terminal members of said gearing, said connections respectively including a rotary driving shaft and an independently rotatable driving sleeve concentric therewith, and control means by which said driving connections may be established selectively.

9. A driving mechanism for selectively imparting motions at a rapid traverse rate or a relatively slower feed rate to a machine tool element from a single source of rotary power comprising, in combination, a rotatable driving element, differential gearing having first and second terminal members and an intermediate member, the latter being connected to said machine tool element, means providing a normally engaged driving connection between said driving element and said first terminal member of a ratio such as to effect rotation of said intermediate member at a feed rate when said other terminal member is held against rotation, releasable means for holding said second terminal member against rotation, releasable means for connecting said second terminal member to said driving element to rotate said intermediate member at a rapid traverse rate, and means operable at will to free said second terminal member for independent rotation without disturbing said normally engaged driving connection, whereby the driving connection for said intermediate member may be completed by actuation of said last named means while leaving the connection of said first terminal member engaged preparatory to a subsequent movement of said intermediate member in response to a subsequent engagement of said first named releasable means.

JOHN R. JOHNSON.